UNITED STATES PATENT OFFICE.

CARL RUDOLF PAUL STEINAU, OF CLEVELAND, OHIO.

PROCESS OF PURIFYING ZINC-BEARING ORES.

SPECIFICATION forming part of Letters Patent No. 697,898, dated April 15, 1902.

Application filed January 12, 1901. Serial No. 42,991. (No specimens.)

*To all whom it may concern:*

Be it known that I, CARL RUDOLF PAUL STEINAU, a subject of the Emperor of Germany, and a resident of Cleveland, in the county of Cuyahoga and State of Ohio, have invented a new and Improved Process of Purifying Zinc-Bearing Solutions, of which the following is a full, clear, and exact description.

My invention relates to the purification of zinc-bearing solutions, such as are used in the manufacture of lithopone, (a white paint containing zinc sulfid.) This article has been made by causing to react upon each other either a solution of barium sulfid (BaS) and one of zinc sulfate ($ZnSO_4$) or solutions of sodium sulfate ($NaSO_4$) and zinc chlorid, ($ZnCl_2$.) The commercial zinc-bearing solutions employed are not very pure, and the product—that is, the lithopone—will not have the desired perfect white color unless the impurities, and particularly the metallic salts, are removed. In practice zinc-bearing ores (from which the zinc-bearing solution is made) contain various metals, and hitherto the zinc-bearing solution has been treated particularly to remove salts of the heavy metals, as copper, lead, arsenic, cadmium, iron, and manganese. I have, however, found that an important cause of contamination is the presence of nickel and cobalt salts, and these have not been removed by the processes hitherto used.

The object of my invention, therefore, is to provide a commercially-applicable method of purifying zinc-bearing solutions in such a manner as to remove any nickel or cobalt compounds they may contain, so that lithopone made from such purified solutions will have a white color of a purity or perfection not hitherto attained.

To this end I proceed as follows: I insert into the zinc-bearing solution at ordinary temperature or under the application of heat zinc powder or comminuted zinc, or either alone, or equal parts of zinc powder and unoxidized powdered iron-filings, (*ferrum limatum pulverisatum,*) or zinc powder and unoxidized strips of sheet-iron; or instead of iron I may employ equivalent metals—that is to say, metals which are kindred with zinc, as lead or copper. The result of this first step is the precipitation of copper, lead, arsenic, and cadmium upon the zinc particles and at the same time a decrease in the acidity of the solution should it contain an excess of free acid. The amount of zinc powder may vary; but in most cases one pound of zinc powder (if used alone) will be sufficient for treating thirty-five to forty gallons of a zinc-sulfate solution of 30° to 40° Baumé. The precipitation with zinc powder is completed in a few hours, whereas with sheet-zinc or the like, as used hitherto, several days are required for this step. Thereupon the solution (after filtration, if desired) is treated with calcium hydrochlorite or oxychlorid of lime, $Ca(OCl)_2$, the result of this treatment being the precipitation of iron as hydroxid of iron, $Fe(OH)_3$, and of manganese as manganese peroxid, $(MnO_2,)$ with the simultaneous formation of calcium sulfate, ($CaSO_4$.) The removal of iron and manganese by treatment with oxychlorid of lime is not new and forms in itself no part of my invention.

The third step of my process consists in adding to the solution, preferably while keeping it at a temperature of about 92° to 96° centigrade, either sodium hypochlorite (NaClO) and sodium hydrate, (NaOH,) or potassium hypochlorite (KClO) and potassium hydrate, (KOH,) or equivalent compounds of other alkalies capable of forming hydrates. For seven hundred and ninety gallons of zinc solution of 30° to 40° Baumé I may use about two-thirds to three-fourths of a gallon of NaClO and two-fifths to one-half of a gallon of NaOH. By this treatment, a black precipitate of nickel hydrate, $Ni(OH)_2$, and of cobalt hydrate, $Co(OH)_2$, is formed, together with some zinc hydrate, $Zn(OH)_2$, and with nickel oxid hydrate, $Ni_2(OH)_6$, and cobalt oxid hydrate, $Co_2(OH)_6$. I find, however, that part of the cobalt and nickel remains in solution, (as sulfates,) and to remove this I gradually add to the solution zinc powder or the equivalent agents mentioned with reference to the first step of my process—that is, a mixture of zinc powder and comminuted iron, zinc powder, and unoxidized iron in the form of strips or lumps, and zinc powder and a metal having the same action as iron. The proportions may vary; but, to give an instance, I may say that with a zinc-sulfate solution of 30° to 40° Baumé one pound of zinc powder, used alone, will suffice for treating thirty-five to forty gallons of solution. The cobalt and nickel are precipitated in metallic form from the sulfates or chlorids and hydrates, so that there is a sediment or deposit consisting of zinc powder, (and iron powder if this were used,) zinc hydrate, and metallic nickel and cobalt. The purified zinc solution is separated from the sediment by filtration or equivalent procedure.

The third step of the process may be omitted if the treatment described in the foregoing paragraph is performed at a temperature of from 40° to 96° centigrade. In any event treatment with comminuted zinc or zinc powder, either alone or with iron or its equivalent, is the last step of the purifying process. The efficacy of the process is to be attributed to the presence of zinc powder, which is a mixture of zinc and zinc oxid (ZnO) in the proportions of seventy-five to eighty parts and twenty to twenty-five parts, respectively, and constitutes an extremely-powerful reducing agent for cobalt and nickel, particularly in the presence of unoxidized iron, hydrogen gas being formed, which causes all the cobalt and nickel to be precipitated in a short time. A further advantage of this final treatment with zinc powder is the freeing of the solution from chlorin, which is often present as hypochloric acid, (HClO,) and sometimes would be troublesome in the manufacture of lithopone.

The zinc hydrate, $Zn(OH)_2$, contained in the precipitate or sediment may be treated in any suitable manner to utilize it again as zinc sulfate ($ZnSO_4$) or zinc chlorid ($ZnCl_2$)—for instance, by means of dilute sulfuric acid ($H_2SO_4$) or of dilute hydrochloric acid (HCl), since these dilute acids have no action on metallic nickel or cobalt.

I desire it to be understood that in my process I may use zinc powder or comminuted zinc, either alone or mixed with iron or metals electronegative to zinc, and that the claims cover such equivalents of zinc powder.

Having thus described my invention, I claim as new and desire to secure by Letters Patent—

1. The process of purifying zinc-bearing solutions containing copper, lead, arsenic, cadmium and other metals kindred with zinc, which consists in treating such solutions with zinc powder, that is to say, with a mixture of about seventy-five parts of zinc and about twenty parts of zinc oxid, to precipitate the copper, lead, arsenic, and cadmium and to simultaneously reduce the amount of any free acid the solution may contain.

2. The process of purifying zinc-bearing solutions containing copper, lead, arsenic, cadmium, or metals kindred with zinc, which consists in treating the solutions with unoxidized iron and zinc powder consisting of zinc proper and zinc oxid in the proportions of about seventy-five to twenty parts, respectively, as described.

3. The process of purifying zinc-bearing solutions, containing iron, manganese, cobalt, which consists in treating such solutions with zinc powder, to precipitate the metals kindred with zinc, then removing any iron and manganese that may be contained in the solutions, and, lastly, again treating the partly-purified solution with zinc powder, to precipitate the cobalt and nickel, as described.

4. The process of purifying zinc-bearing solutions containing hydrochloric acid, iron, manganese, cobalt, nickel, copper, lead, arsenic, cadmium or other metals kindred with zinc, which consists in treating the solutions with zinc powder, to precipitate those metals which are kindred with zinc, then removing any iron and manganese that may be contained in the solutions, then treating the latter with the hydrate of an alkali and with the hypochlorite of the same alkali, to remove part of the cobalt and nickel, and, lastly, again treating the partly-purified solution with zinc powder, to precipitate the remainder of cobalt and nickel as described.

In testimony whereof I have signed my name to this specification in the presence of two subscribing witnesses.

CARL RUDOLF PAUL STEINAU.

Witnesses:
W. O. HENDERER,
HENRY L. KAPLINGER.